(12) United States Patent
Noe et al.

(10) Patent No.: US 8,714,932 B2
(45) Date of Patent: May 6, 2014

(54) CERAMIC MATRIX COMPOSITE BLADE HAVING INTEGRAL PLATFORM STRUCTURES AND METHODS OF FABRICATION

(75) Inventors: Mark E. Noe, Morrow, OH (US); Mark W. Marusko, Springboro, OH (US); Joshua B. Jamision, Liberty Township, OH (US); Suresh Subramanian, Mason, OH (US); Michael J. Verrilli, Loveland, OH (US); Paul Izon, Morrow, OH (US)

(73) Assignee: General Electric Company, Schenectady, NY (US)

( * ) Notice: Subject to any disclaimer, the term of this patent is extended or adjusted under 35 U.S.C. 154(b) by 1184 days.

(21) Appl. No.: 12/347,050

(22) Filed: Dec. 31, 2008

(65) Prior Publication Data

US 2011/0027098 A1    Feb. 3, 2011

(51) Int. Cl.
*B63H 1/26*    (2006.01)

(52) U.S. Cl.
USPC ...... 416/241 B; 416/229 A; 156/92; 156/280; 156/560

(58) Field of Classification Search
USPC ............ 416/241 B, 229 A; 156/280, 560, 92
See application file for complete search history.

(56) References Cited

U.S. PATENT DOCUMENTS

| | | | | |
|---|---|---|---|---|
| 5,403,153 | A * | 4/1995 | Goetze ...................... | 416/229 A |
| 6,843,565 | B2 * | 1/2005 | Evans et al. ...................... | 353/28 |
| 7,223,465 | B2 | 5/2007 | Subramanian et al. | |
| 7,306,826 | B2 | 12/2007 | Subramanian et al. | |
| 2002/0127112 | A1 * | 9/2002 | Stowell et al. ............ | 416/241 R |
| 2004/0021828 | A1 * | 2/2004 | Evans et al. ...................... | 353/28 |
| 2006/0284337 | A1 * | 12/2006 | Subramanian et al. ........ | 264/258 |
| 2007/0072007 | A1 * | 3/2007 | Carper et al. .................. | 428/698 |
| 2007/0148000 | A1 * | 6/2007 | Marusko et al. .......... | 416/193 A |

FOREIGN PATENT DOCUMENTS

| | | |
|---|---|---|
| EP | 1676822 A2 | 7/2006 |
| EP | 1801354 A2 | 6/2007 |
| EP | 1801354 B1 | 2/2012 |
| JP | 2004-190588 A | 7/2004 |
| JP | 2006-189029 A | 7/2006 |
| JP | 2006-193383 A | 7/2006 |
| JP | 2007-205350 A | 8/2007 |

OTHER PUBLICATIONS

PCT/US2009/57827, Search Report and Written Opinion, Aug. 20, 2010.
JP Office Action dated Aug. 25, 2013, from corresponding JP Application No. 20110543510.

* cited by examiner

*Primary Examiner* — Cuong Q Nguyen
*Assistant Examiner* — Yosef Gebreyesus
(74) *Attorney, Agent, or Firm* — McNees Wallace & Nurick LLC

(57) ABSTRACT

A method of making a ceramic matrix composite blade includes laying up at least one ply of the plurality of fibrous ceramic plies in a preselected arrangement to form an airfoil and dovetail preform, laying up at least one additional ply of the plurality of fibrous ceramic plies on the airfoil and dovetail preform in a second preselected arrangement to form an integral platform as part of the non-rigidized blade preform, rigidizing the blade preform to form a rigidized blade preform, and densifying the rigidized blade preform to form a ceramic matrix composite blade having an integral platform structure. A tool for making the ceramic matrix composite blade and a ceramic matrix composite blade are also disclosed.

20 Claims, 6 Drawing Sheets

CERAMIC MATRIX COMPOSITE BLADE HAVING INTEGRAL PLATFORM STRUCTURES AND METHODS OF FABRICATION

STATEMENT REGARDING FEDERALLY SPONSORED RESEARCH OR DEVELOPMENT

Embodiments of the present disclosure were made with government support under Contract No. N00421-05-C-0053. The government may have certain rights.

FIELD

The present disclosure is directed to composite blades having integral platform structures. In particular, the present disclosure relates to ceramic matrix composite blades, methods, and tools of making blades having integral platform structures.

BACKGROUND OF THE DISCLOSURE

In order to increase the efficiency and the performance of gas turbine engines so as to provide increased thrust-to-weight ratios, lower emissions and improved specific fuel consumption, engine turbines are tasked to operate at higher temperatures. As the higher temperatures reach and surpass the limits of the material comprising the components in the hot section of the engine and in particular the turbine section of the engine, new materials are desired.

As the engine operating temperatures have increased, new methods of cooling the high temperature alloys comprising the combustors and the turbine airfoils have been developed. For example, ceramic thermal barrier coatings ("TBCs") were applied to the surfaces of components in the stream of the hot effluent gases of combustion to reduce the heat transfer rate and to provide thermal protection to the underlying metal and allow the component to withstand higher temperatures. These improvements helped to reduce the peak temperatures and thermal gradients. Cooling holes were also introduced to provide film cooling to improve thermal capability or protection. Also, ceramic matrix composites ("CMCs") were developed as substitutes for the high temperature alloys. The CMCs in many cases provided an improved temperature capability and density advantage over the metals, making them the material of choice when higher operating temperatures were desired.

A number of techniques have been used in the past to manufacture turbine engine components, such as turbine blades, using CMCs. For example, silicon CMCs may be formed from fibrous material that is infiltrated with molten silicon. One such process is typically referred to as the Silcomp process. The fibers in this type of process generally have diameters of about 140 micrometers or greater, which prevents intricate, complex shapes, such as turbine blade components, to be manufactured by the Silcomp process.

Another technique of manufacturing CMC turbine blades is the method known as the slurry cast melt infiltration ("MI") process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components includes polymer infiltration and pyrolysis ("PIP"). In this process silicon carbide fiber preforms are infiltrated with a preceramic polymer, such as polysilazane and then heat treated to form a SiC matrix.

Still another technique for forming CMC components may include an oxide/oxide process. In this type of processing, aluminum or alumino-silicate fibers may be prepregged and then laminated into a preselected geometry.

Components may also be fabricated from a carbon fiber reinforced silicon carbide matrix (C/SiC) CMC. The C/SiC processing includes a carbon fibrous preform layed up in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed.

Current methods for forming CMC blades fail to permit the formation of an integral platform. Subsequent formation of the platform and/or the installation of metallic platform structures fail to provide the desired performance characteristics for the blade and may result in disengagement of the platform structure from the airfoil and loss of adequate sealing.

What is needed is a composite having an integral platform structure that is easily formed and provides the desired performance characteristics of a CMC blade.

SUMMARY OF THE DISCLOSURE

In an exemplary embodiment, a method of making a ceramic matrix composite blade includes laying up at least one ply of the plurality of fibrous ceramic plies in a preselected arrangement to form an airfoil and dovetail preform, laying up at least one additional ply of the plurality of fibrous ceramic plies on the airfoil and dovetail preform in a second preselected arrangement to form an integral platform as part of the non-rigidized blade preform, rigidizing the blade preform to form a rigidized blade preform, and densifying the rigidized blade preform to form a ceramic matrix composite blade having an integral platform structure.

In another exemplary embodiment, a tool for making a ceramic matrix composite blade includes a first tool component having a first layup surface capable of receiving at least one ceramic fibrous ply to form an airfoil and dovetail preform, and a second tool component having a second layup surface capable of receiving at least one additional ceramic fibrous ply to form an integral platform preform. In the embodiment, the first layup surface is selectively configurable to permit laying up of the integral platform preform to the airfoil and dovetail preform to form a blade preform.

In yet another exemplary embodiment, a ceramic matrix composite blade assembly includes an airfoil, dovetail, and integral platform having fibrous reinforcement in a preselected arrangement within a ceramic matrix. In the embodiment, the airfoil, dovetail, and integral platform all have a substantially continuous co-rigidized matrix phase.

One advantage of the present disclosure is improved resistance to the localized stresses of gas turbine operation.

Another advantage of the present disclosure is a single tool for fabrication of an airfoil, a dovetail, and an integral platform.

Another advantage of the present disclosure is a unitary airfoil, dovetail, and platform providing improved strength.

Another advantage of the present disclosure is that conventional flowpath sealing hardware designs can be used with angel wings.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION OF THE DISCLOSURE

The present disclosure relates to an article, method, and tool of making a blade including matrix composite material.

Figure 1:
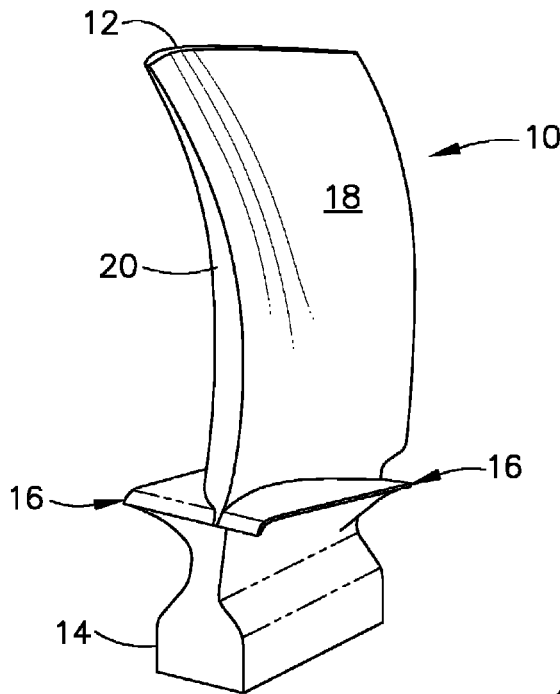
FIG. 1 shows a perspective view of an exemplary embodiment of a blade.

Referring to FIG. 1, an exemplary embodiment of a blade 10 depicted as an aircraft engine LPT blade configured for use in a blade assembly 100 is shown. "Blade" as utilized here includes an article include at least a portion having an airfoil portion, a dovetail portion and a platform and may be a preform, a rigidized component and/or a densified component. In other embodiments, blade 10 is configured for use in a fan blade assembly, a compressor blade assembly, or any other suitable application. In some embodiments, the assembly may include one or more blades 10 (see FIGS. 1 through 4). In alternate embodiments, the assembly may include one or more blades 10 or no blades 10 (see FIGS. 5 and 6). Blade assembly 100 and/or blade 10 may be fabricated from a ceramic matrix composite ("CMC"). In other embodiments, blade assembly 100 and/or blade 10 may include other matrix materials, such as, for example, epoxy materials (for example, for fans), polymer composite (for example, for compressors), or any other suitable matrix material.

As shown in FIG. 1, blade 10 is formed from a ceramic composite material, such as, but not limited to silicon carbide fibers embedded in a silicon carbide matrix (SiC/SiC). Blade 10 includes an airfoil 12 against which the flow of hot exhaust is directed. Blade 10 can be mounted to a turbine disk (not shown) by dovetail 14 extending downwardly from airfoil 12 and engaging a slot (not shown) of a corresponding geometry on a turbine disk. Dovetail 14 and surfaces of airfoil 12 form a concave intersection. In other embodiments, blade 10 may include geometry corresponding with other suitable applications.

Figure 2:
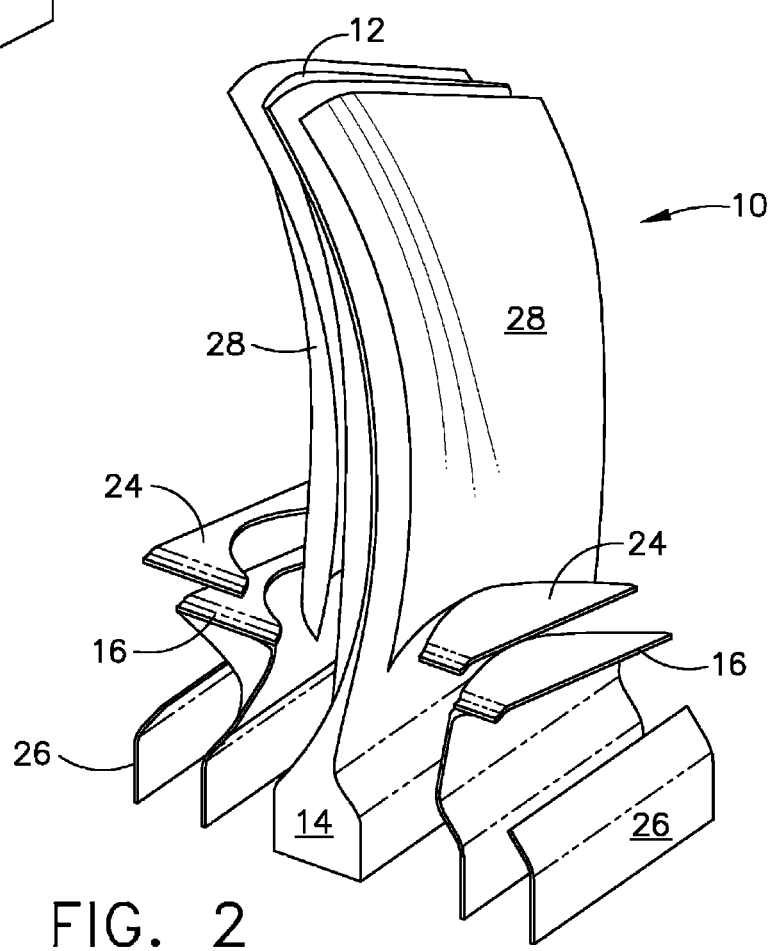
FIG. 2 shows an exploded perspective view of an exemplary embodiment of a blade preform.

In the embodiments of blade 10 shown in FIGS. 1 through 4, blade 10 includes integral platforms 16 on a pressure side 18 and/or a suction side 20 of a dovetail 14. This configuration can further integrate dovetail 14 with airfoil 12 and dovetail 14 by including fibrous reinforcement in a preselected arrangement within a ceramic matrix thereby forming a substantially continuous co-rigidized matrix phase as described below. Referring to FIG. 2, blade 10 may include an inner layer, for example airfoil 12, formed by laid up plies in a preselected arrangement in unitary arrangement with dovetail 14 formed by laid up plies in a second preselected arrangement. Matrix material 28 may be laid up on the airfoil 12 and optionally or partially on dovetail 14. Integral platform 16 may be formed by a third set of plies, for example, integral platform plies 22, in a third preselected arrangement. Plies are stacked to fabricate the composite preform. Ply material that can be used includes prepreg material consisting of ceramic fibers, or woven or braided ceramic fiber cloth ply material, or stacked ceramic fiber tows. The third preselected arrangement may be configured to be laid up on dovetail 14 as discussed below. Platform surfaces 24 and dovetail surfaces 26 may be laid up on integral platform plies 22 thereby enclosing integral platform 16.

Figure 3:
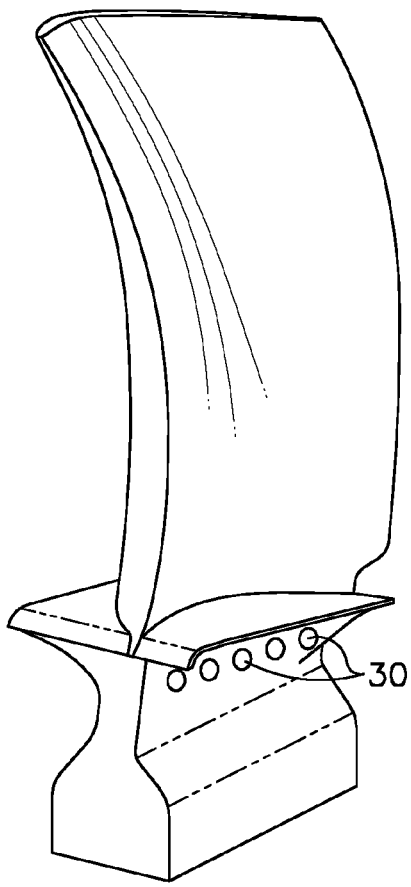
FIG. 3 shows a perspective view exemplary embodiment of a blade.
Figure 4:
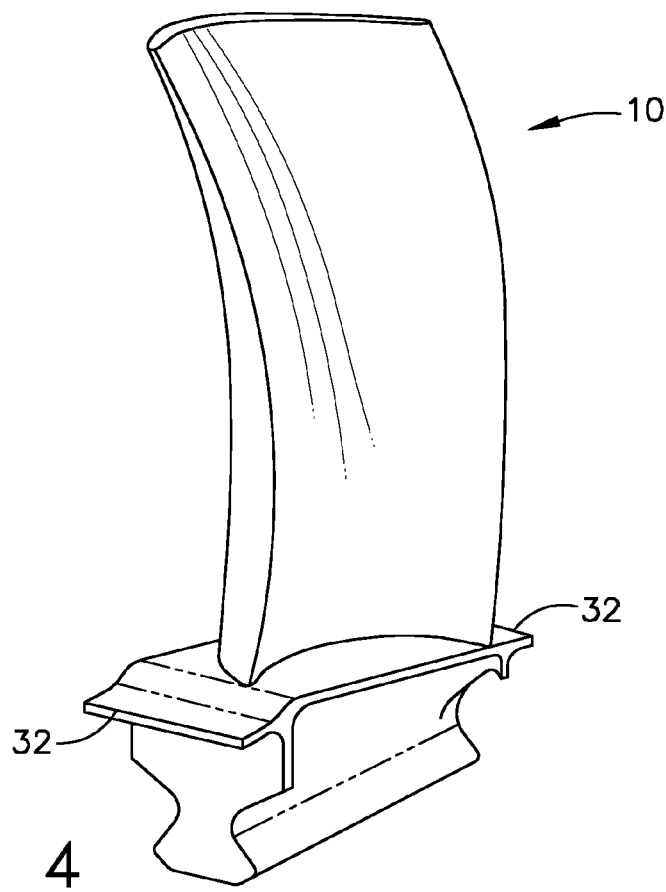
FIG. 4 shows a perspective view another exemplary embodiment of a blade.

Referring to FIG. 3, blade 10 may include pins 30. Pins 30 can be prepreg SiC/SiC pins in cured form and/or SiC/SiC CMC pins. Alternatively, the pins 30 may be include carbon or graphite materials, for example, in C/SiC CMC blades 10. Further, the pins 30 may be include prepreg oxide/oxide or consolidated oxide, for example, in oxide/oxide CMC blades 10. Pins 30 can be located below integral platform 16 or on platform surface 44. Referring to FIG. 4, blade 10 may include angel wings 32. Pins 30 provide fiber reinforcement though the thickness of the platform 16 and dovetail 14.

Figure 5:
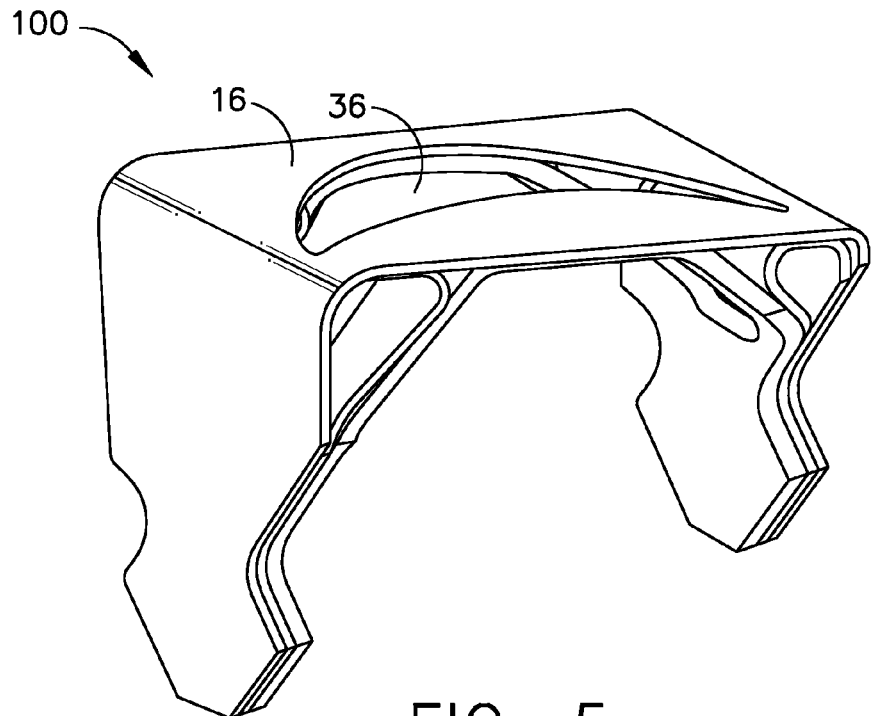
FIG. 5 shows a perspective view of an exemplary embodiment of blade assemblies.
Figure 6:
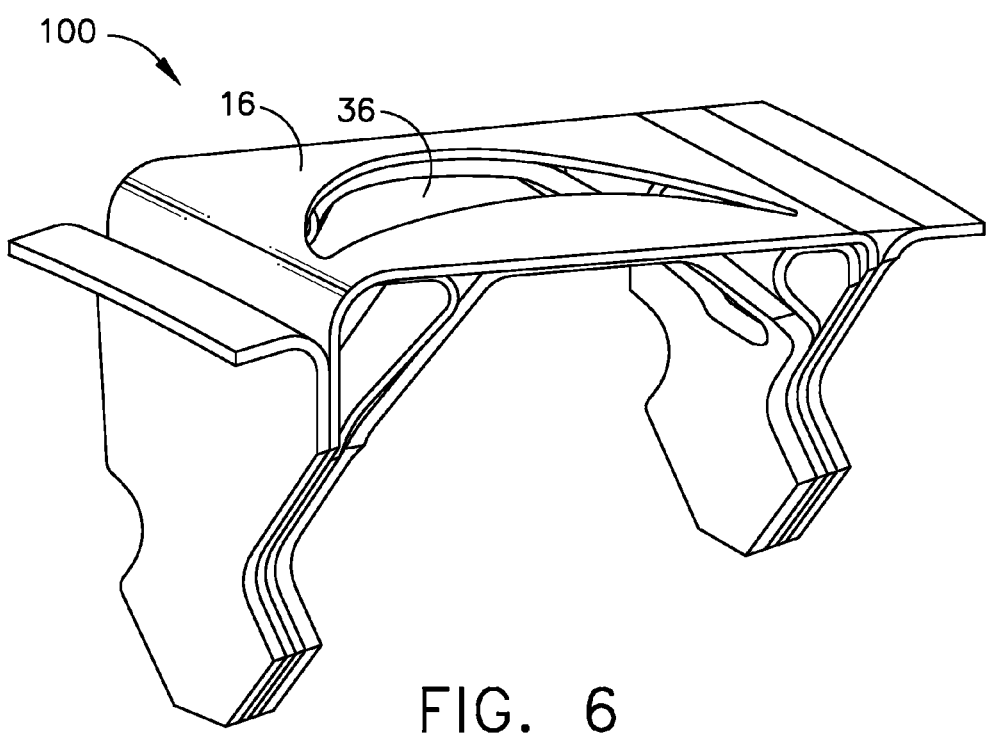
FIG. 6 shows a perspective view of an exemplary embodiment of blade assemblies.

Referring to FIGS. 5 and 6, blade assembly 100 may include an integral platform 16 upon fabrication. The term "blade surrogate" includes an article having a geometry capable of forming a blade aperture 36 and may be constructed of any suitable material including, but not limited to, metal. Referring to FIG. 5, platform 16 may extend around blade aperture 36 formed by blade 10 or the blade surrogate during fabrication. In this embodiment, platform 16 serves as the platform for suction side 20 and pressure side 18 of blade 10. Platform 16 may include prepreg SiC/SiC CMC or, as described above, any other suitable material. In yet another embodiment, shown in FIG. 6, angel wings 32, similar to those described in FIG. 4, may be added to the embodiment shown in FIG. 5.

Figure 7:
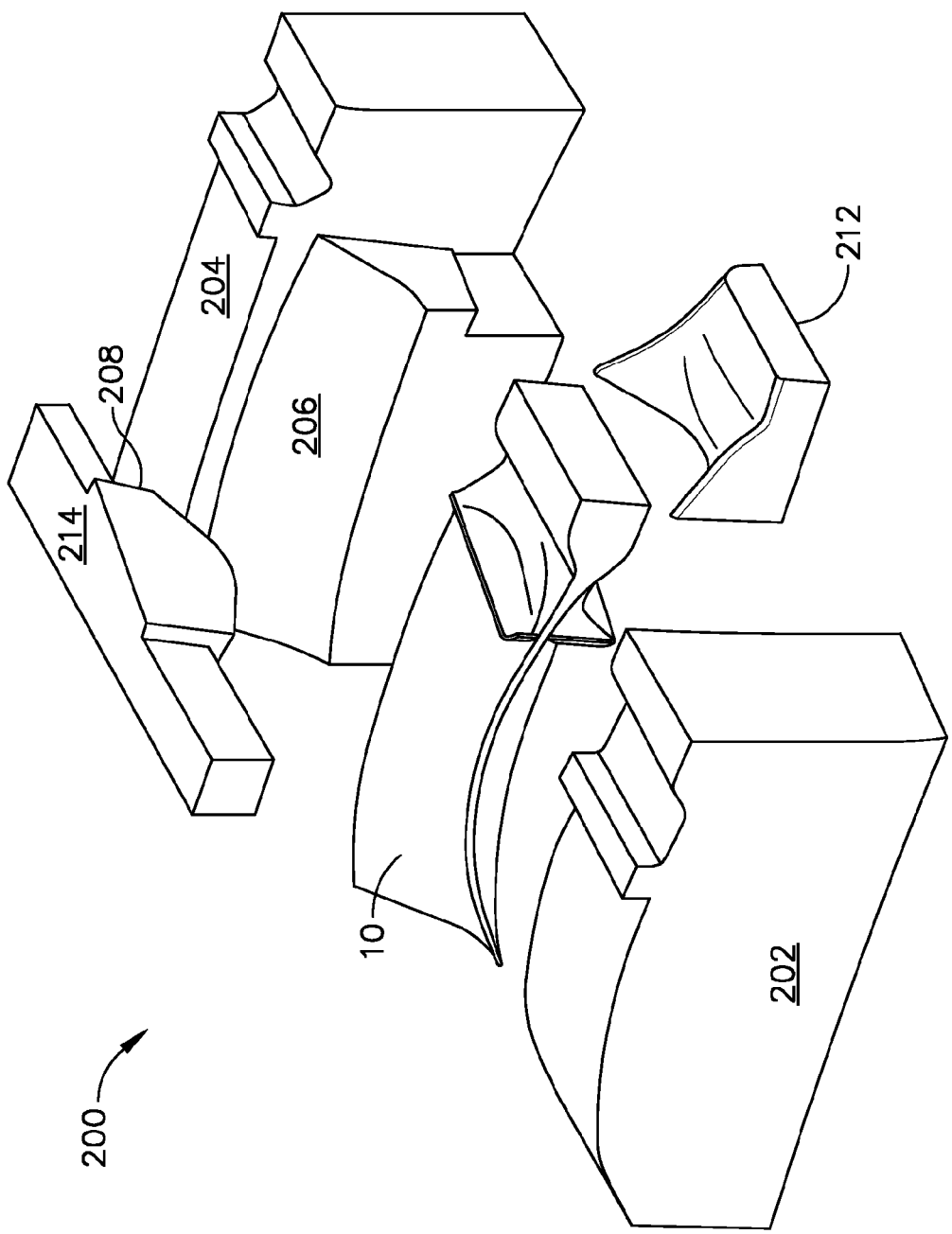
FIG. 7 shows a perspective view of an exemplary embodiment of an unassembled tool for making a blade assembly.
Figure 8:
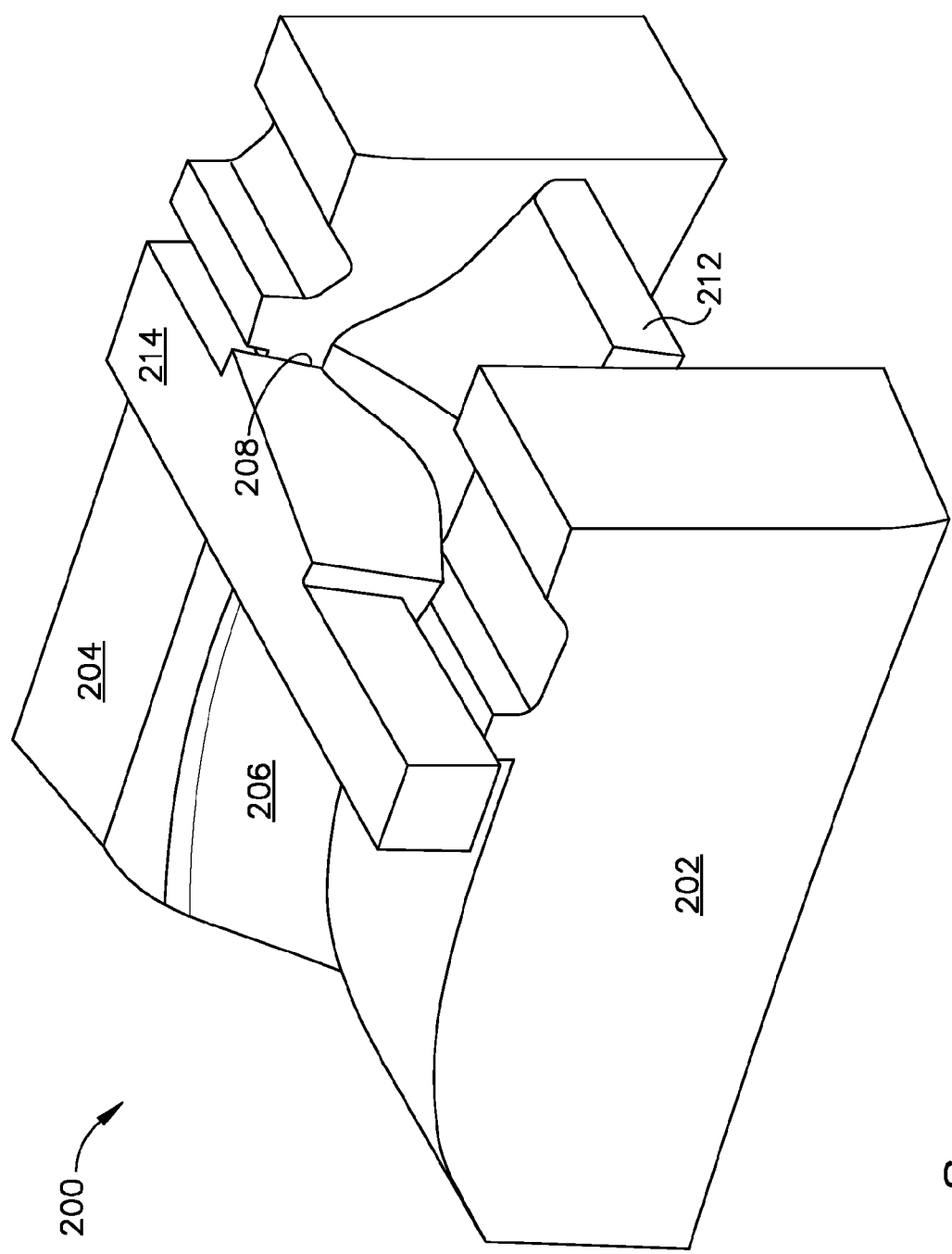
FIG. 8 shows a perspective view of an exemplary embodiment of an assembled tool for making a blade assembly.

Referring to FIGS. 7 and 8, exemplary embodiments of a tool for fabricating blade 10 are shown. Tool 200 can be used for fabricating blade 10 or blade assembly 100, including an airfoil and dovetail preform, and integral platform preform. Generally, tool 200 can include first component and a second component. The first tool component can include a first layup surface 206 capable of receiving at least one ceramic fibrous ply to form the airfoil and dovetail preform. The second tool component can include a second layup surface 208 capable of receiving at least one additional ceramic fibrous ply to form the integral platform preform. The first layup surface 206 and the second layup surface 208 are not limited to those shown in FIGS. 7 and 8 and may include other surfaces including surfaces of the opposing sides 202, 204 or other components or inserts utilized with tool 200. In one embodiment, the first layup surface 206 may be selectively configurable to permit laying up of the integral platform preform to the airfoil and dovetail preform to form a blade 10 preform.

An exemplary tool 200, as shown in FIGS. 7 and 8, includes a first set of opposing sides 202, 204 configured to abut each other and be fastened together. As shown, sides 202, 204 can be arranged as a mold for blade 10 or a section for holding the blade surrogate. Sides 202, 204 can include a first layup surface 206 designed to permit fabrication of the desired shape for blade 10. Tool 200 further includes a second set of opposing sides 208, 210 configured to provide pressure on airfoil 12 and dovetail 14, respectively (or, in the alternate embodiments, on the blade surrogate). Tool 200 may include a dovetail die 212 and/or a bridge 214 or other structures to provide a selectively configurable surface for laying up preform material, such as ceramic fiber material. In one embodiment, the dovetail die 212 may further define a layup surface, for example the first layup surface. In another embodiment, the dovetail die 212 is configured for the airfoil and dovetail preform and the integral platform preform to be co-rigidized.

Figure 9:
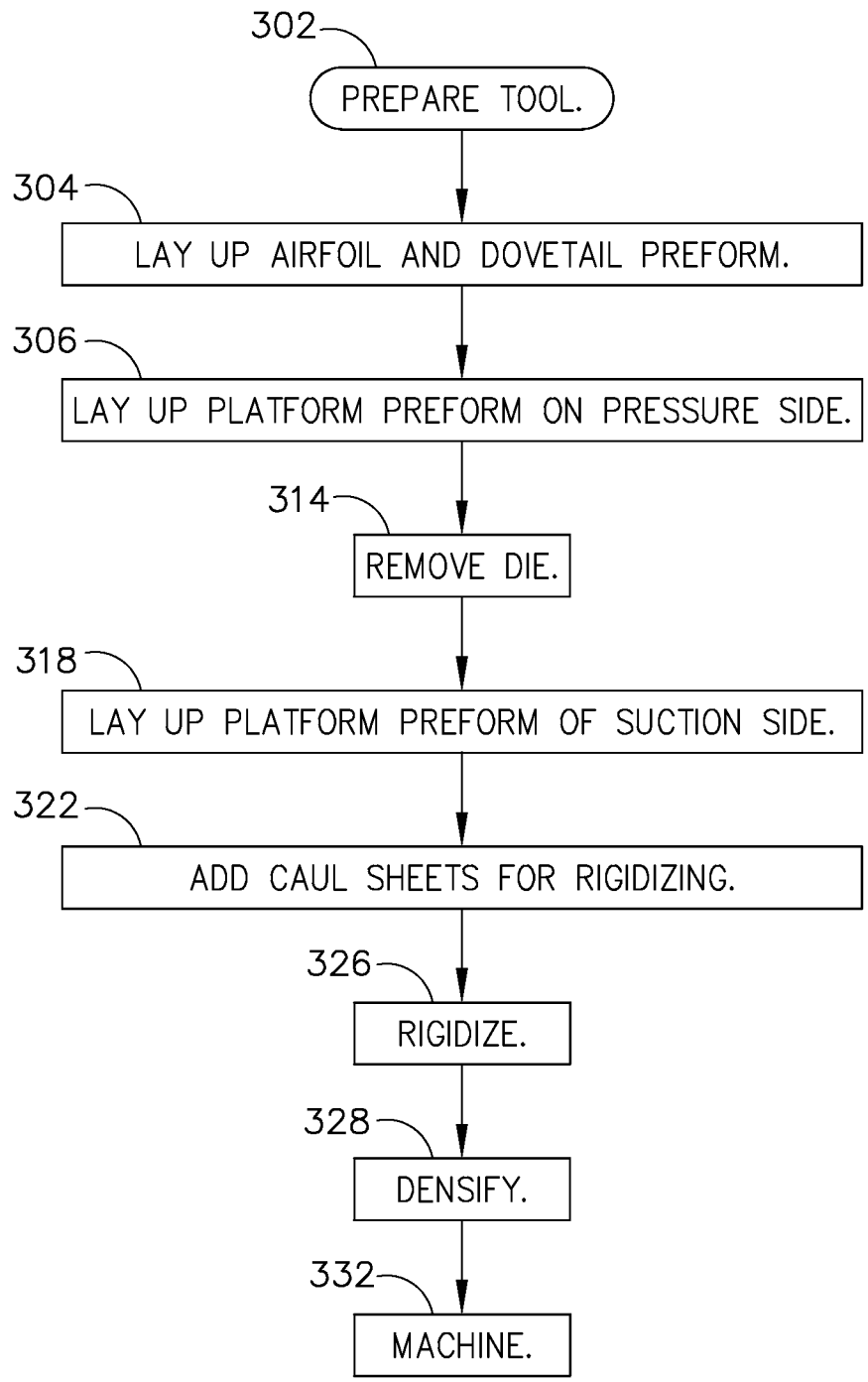
FIG. 9 illustrates an exemplary embodiment of a process for fabricating a blade assembly.

Referring to FIG. 9, an exemplary process for fabricating blade 10 using tool 200 is shown (process 300). First, tool (for example, tool 200) is prepared (step 302). Preparation of the tool can include, for example, cleaning the tool with acetone, and/or applying a release agent on dovetail die 212. As will be appreciated, release agent can be applied elsewhere on tool 200.

Referring again to FIG. 9, next, layup of airfoil 12 and dovetail 14 can be performed (step 304) on first layup surface 206 (see for example FIGS. 7 and 8). Layup can include at least one ply of a plurality of fibrous ceramic plies in a preselected arrangement to form an airfoil and dovetail preform. Layup of airfoil 12 can include, laying up ceramic fiber plies in a manner known in the art for applying ceramic fiber plies to a non-variable surface. Plies may be added or removed as needed to provide the desired thickness.

Thereafter the pressure side 18 of the platform 16 is laid up (step 306) on for example layup surface 208. Layup can include at least one additional ply of a plurality of fibrous ceramic plies in a second preselected arrangement to form an integral platform preform to form a non-rigidized blade preform. Lay up of platform 16 of pressure side 18 can include, for example, the fibrous plies, and applying matrix plies against bridge 214, removing extra matrix material and adding or removing plies, as needed to provide the desired thickness. In an alternate embodiment of using tool 200 to fabricate blade assembly 100, a blade surrogate is in tool 200 and laying up airfoil 12 and dovetail 14 is omitted. In the alternate embodiment, platform 16 is laid up on the blade surrogate with, for example, release material on the blade surrogate.

Referring again to FIG. 9, next, a die (for example, dovetail die 212) can be removed (step 314) thereby permitting layup of platform 16 of suction side 20 (step 318). Lay up of platform 16 of suction side 20 can include, for example, applying fibrous plies, and matrix plies against surfaces of tool 200, including surfaces of tool side 204. In other embodiments, additional structures or components may be utilized to form the surface onto which the platform 16 of the suction side 20 is formed.

Caul sheets (not shown) or other known tool components for ridgidizing processes can then be applied to blade 10 surfaces in preparation for ridgidizing (step 322). The caul sheets provide support and sealing for the composite component and permit formation of a densified composite having a desired geometry.

Next, the non-rigidized blade preform can be rigidized (step 326). The components may be rigidized at elevated temperatures and pressures. While not so limited, the components may be rigidized at temperatures from about 200 to about 400° C. and pressures from about 50 to about 300 psig. Additionally or alternatively, rigidizing can include curing (for example, heating), compression molding, bladder molding, or other suitable methods of hardening blade assembly 100. Rigidizing can include applying BN and SiC coatings using a chemical vapor infiltration (CVI) process as is known in the art, forming a rigid coated turbine blade preform. The term "co-rigidizing" (and grammatical equivalents thereof) includes rigidizing at substantially the same time or, at a minimum, an overlapping period during which two objects are rigidized. Co-rigidizing can produce a substantially continuous matrix phase with additional strength believed (although not intended to be limited by theory) to be provided by increased bonding between the airfoil, the dovetail, and the integral platform. The term "non-rigidized" (and grammatical equivalents thereof) describes objects that have not been rigidized at all or, at a minimum, have been partially rigidized to a point that the rigidizing is insubstantial. The term "partially rigidizing" (and grammatical equivalents thereof) includes rigidizing to a detectable point but not rigidizing to a fully rigidized point. The term "fully rigidized" includes rigidizing to a point for which an object is rigidized to an end desired point. The rigidizing terms form a hierarchy with some overlap between proximate terms. For example, the terms non-rigidized, partially rigidized, and fully rigidized express increasing amount of rigidizing (with some overlap). In an exemplary embodiment, the airfoil and dovetail preform and the integral platform preform may be co-rigidized with an initial partial rigidizing followed by a subsequent rigidizing. In all embodiments, when rigidizing is substantially complete, a rigidized blade preform is formed.

In one embodiment, additional plies and/or angel wing preform structures can then be laid up on platform surface 24. In the embodiment, an additional rigidizing step, as described above, may be included. In yet another embodiment, additional plies may then be laid up followed by yet another rigidizing step, as described above. In an alternate embodiment, the blade surrogate can then be removed. In a further alternate embodiment, the blade assembly 100 can then be placed over a unitary dovetail and airfoil component and additional plies my then be laid up followed by another rigidizing step.

Next, the rigidized blade preform can then be partially densified (step 328) by, for example, introducing a carbon-containing slurry, as is known in the art, into the porosity of the rigidized blade preform. Finally, the rigidized blade preform can be further densified (step 330) with, for example, at least silicon, and alternatively boron doped silicon, through a melt infiltration process, as known in the art, forming the blade. Other techniques for forming components according to the present disclosure include polymer infiltration and pyrolysis ("PIP"). In this process silicon carbide fiber preforms are infiltrated with a preceramic polymer, such as polysilazane and then heat treated to form a SiC matrix. Alternatively the components may include an oxide/oxide process. In this type of processing, aluminum or alumino-silicate fibers may be prepregged and then laminated into a preselected geometry and subsequently heated to form the ceramic matrix. Components may also be fabricated from a carbon fiber reinforced silicon carbide matrix (C/SiC) CMC. The C/SiC processing includes a carbon fibrous preform layed up in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed.

Thereafter, blade 10 can then be machined (step 332) to provide the desired final geometry. In this embodiment, platform 16 can include SiC-coated fibers and a polymer-based matrix. Materials such as a low melt alloy, machining wax, and/or polymeric materials can be used to encapsulate platform 16. To avoid adsorption of contaminates that exist in some machining fluids, blade 10 may be cooled with water during machining. Cutting direction may be predetermined to avoid tearing out fibrous materials. Cutting feeds and speeds may also be predetermined to avoid damage to blade 10 in the form of delamination or removal of fibers at the surface.

In another embodiment, for example, in CMC formation methods including SiC/SiC slurry cast, C/SiC, or PIP, the method includes a tool fabricated from graphite or another material suitable for use at temperatures above 1500° F. As in the process described in FIG. 9, the tool is prepared (step 304) and the airfoil, dovetail, and both platforms and layed up (step 304, 306 and 318). However, for this embodiment, the removal window (die, or item 212) is not required. Tool 200 includes a pocket on the suction side for the suction side platform. As in the process described in FIG. 9, a bridge 214 is utilized for the pressure side platform 16. Thereafter, the preform is rigidized (step 326). For C/SiC and slurry cast SiC/SiC, chemical vapor infiltration (CVI) is the first rigidization process. The tool 200 would be removed after some of the CVI process. For the polymer infiltration and pyrolysis (PIP) component formation, the preform is infiltrated with a pre-ceramic polymer, such as polysilazane. The rigidization step in this embodiment is heat treatment to convert the polymer to SiC or $Si_3N_4$. For the PIP process, the tool would be removed after several cycles. Thereafter, as recited in the process described in FIG. 9, the densification (step 328) and machining (332) are completed.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of making a ceramic matrix composite blade comprising:
    laying up at least one ply of a plurality of fibrous ceramic plies in a preselected arrangement to form an airfoil and dovetail preform;
    laying up at least one additional ply of the plurality of fibrous ceramic plies on the airfoil and dovetail preform in a second preselected arrangement to form an integral platform preform, the integral platform being stacked on the airfoil and dovetail preform to form a non-rigidized blade preform;
    rigidizing the non-rigidized blade preform to form a rigidized blade preform, wherein the airfoil, dovetail and integral platform have a substantially continuous co-rigidized composite phase; and
    densifying the rigidized blade preform to form the ceramic matrix composite blade having an integral platform structure.

2. The method of claim 1, wherein the rigidizing includes a partial rigidizing and a final rigidizing.

3. The method of claim 1, wherein the densifying includes a partial densifying of the rigidized blade preform with a carbon-containing slurry.

4. The method of claim 1, wherein the densifying further includes densifying the rigidized blade preform with at least silicon.

5. The method of claim 1, wherein the rigidizing and densifying are a slurry cast melt infiltration process.

6. The method of claim 1, wherein the rigidizing and densifying are a chemical vapor infiltration process.

7. The method of claim 1, wherein the rigidizing and densifying are a polymer infiltration and pyrolysis process.

8. The method of claim 1, further comprising applying matrix material to the non-ridgidized blade preform.

9. The method of claim 1, further comprising laying up at least one additional fibrous ceramic ply to form an angel wing preform after the partial rigidizing and prior to the final rigidizing.

10. The method of claim 1, further further comprising laying up at least one additional fibrous ceramic ply on the non-rigidized blade preform to form an angel wing preform.

11. The method of claim 8, further comprising adding one or more caul sheets to the non-rigidized blade preform.

12. The method of claim 8, further comprising machining the component after densifying.

13. The method of claim 1, wherein the blade includes pins.

14. A tool for making a ceramic matrix composite blade comprising:
    a first tool component having a first layup surface capable of receiving at least one ceramic fibrous ply to form an airfoil and dovetail preform;
    a second tool component having a second layup surface capable of receiving at least one additional ceramic fibrous ply to form an integral platform preform;
    wherein the first layup surface is selectively configurable to permit laying up of the integral platform preform to the airfoil and dovetail preform to form a blade preform.

15. The tool of claim 14, wherein the first layup surface includes a dovetail die that is removable to alter the first layup surface.

16. The tool of claim 15, wherein the presence or the absence of the dovetail die in the first tool component determines the geometry of the first layup surface.

17. A ceramic matrix composite blade assembly comprising:
    an airfoil, dovetail, and integral platform having fibrous reinforcement in a preselected arrangement within a ceramic matrix, wherein the integral platform includes platform surfaces and dovetail surfaces enclosing the integral platform;
    wherein the airfoil, dovetail, and integral platform all have a substantially continuous co-rigidized composite phase.

18. The blade assembly of claim 17, further comprising pins arranged on the blade assembly.

19. The blade assembly of claim 17, further comprising angel wings on the blade assembly.

20. The blade assembly of claim 17, further comprising a separate member arranged and disposed for sealing a first blade to a second blade.

* * * * *